United States Patent
Thiessen et al.

(10) Patent No.: US 6,851,792 B2
(45) Date of Patent: Feb. 8, 2005

(54) MULTIPLE-PASS APPROACH TO FLUID EJECTION OVER MEDIA SWATH IN ONE PASS

(75) Inventors: Kurt Thiessen, San Diego, CA (US); Antoni Murcia, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 26 days.

(21) Appl. No.: 10/338,484

(22) Filed: Jan. 8, 2003

(65) Prior Publication Data

US 2004/0130595 A1 Jul. 8, 2004

(51) Int. Cl.$^7$ .................................................. B41J 2/21
(52) U.S. Cl. ............................. 347/43; 347/15; 347/41
(58) Field of Search ................................ 347/43, 15, 41, 347/40, 12, 16, 37

(56) References Cited

U.S. PATENT DOCUMENTS

| | | | |
|---|---|---|---|
| 5,587,730 A | | 12/1996 | Karz |
| 5,844,585 A | * | 12/1998 | Kurashima et al. ........... 347/43 |
| 6,017,113 A | | 1/2000 | Azmoon |
| 6,616,267 B2 | * | 9/2003 | Weijkamp .................... 347/43 |
| 2002/0070997 A1 | | 6/2002 | Moriyama |

FOREIGN PATENT DOCUMENTS

EP     1085458 A    3/2001

* cited by examiner

Primary Examiner—Lamson D Nguyen (57) ABSTRACT

A method of one embodiment of the invention is disclosed that ejects fluid over a current swath of media in one pass by a first fluid-ejection component, according to a first intended pass of a multiple-pass approach for the current swath. Fluid is also ejected over the current swath of media in the one pass by a second fluid-ejection component, according to a second intended pass of the multiple-pass approach for the current swath.

31 Claims, 5 Drawing Sheets

MULTIPLE-PASS APPROACH TO FLUID EJECTION OVER MEDIA SWATH IN ONE PASS

BACKGROUND

Inkjet printers have become popular for printing on media, especially when precise printing of color images is needed. For instance, such printers have become popular for printing color image files generated using digital cameras, for printing color copies of business presentations, and so on. Industrial usage of inkjet printers has also become common for high-speed color printing on large numbers of items. An inkjet printer is more generically a fluid-ejection device that ejects fluid, such as ink, onto media, such as paper.

For increased quality when printing, inkjet printers often utilize a multiple-pass approach. The information to be output onto the media is divided into two or more passes. The inkjet printhead passes over the same area of media a number of times, each time outputting ink on the same area in accordance with a different pass of the multiple-pass approach. Defects that would otherwise result in printing all the information in one pass over the media, due to missing or misdirected inkjet nozzles, and so on, are effectively hidden when passing over the media multiple times.

However, employing a multiple-pass approach slows printing, since each area of the media is passed over by the printhead more than one time.

SUMMARY

A method of one embodiment of the invention ejects fluid over a current swath of media in one pass by a first fluid-ejection component, according to a first intended pass of a multiple-pass approach for the current swath. Fluid is also ejected over the current swath of media in the one pass by a second fluid-ejection component, according to a second intended pass of the multiple-pass approach for the current swath.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Multiple-Pass Approach to Fluid Ejection

Figure 1A:
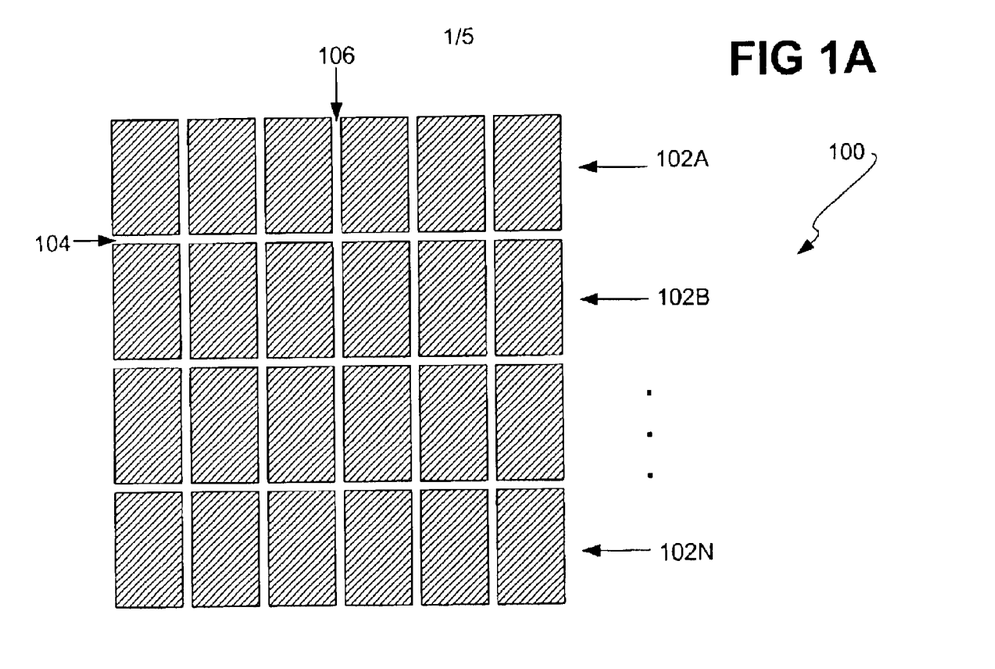
FIG. 1A is a diagram of a simplified example output resulting from a single-pass approach to fluid ejection, upon which embodiments of the invention can improve. The diagram of FIG. 1A depicts normalized defects resulting from a single-pass approach to fluid ejection, and in actuality, the defects are likely not to be as regular as shown, as can be appreciated by those of ordinary skill within the art.

FIG. 1A shows a simplified example output 100 of a single-pass approach to fluid ejection, upon which embodiments of the invention can improve. Fluid output on a number of media swaths 102A, 102B, ... 102N, collectively referred to as the media swaths 102, is depicted. The media may be paper, or another type of media, and the fluid may be ink, or another type of fluid. On each of the swaths 102, fluid is output in a single pass by a fluid-ejection component, such as an ink-ejection component. A single pass by the fluid-ejection component means that the fluid-ejection component passes over a given swath of the media once to eject fluid onto the swath.

Any missing or misdirected nozzles of the fluid-ejection component can result in visible detects on the media swaths 102 during a one-pass approach to fluid ejection. For instance, the fluid ejected onto the media swaths 102 should result in vertically aligned solid horizontal strips. However, due to the defects in the fluid-ejection component ejecting fluid in single passes over the swaths 102, there are visible horizontal gaps, such as the visible horizontal gap 104, and visible vertical gaps, such as the visible vertical gap 106. Such visible defects detract from the overall quality of the simplified example output 100 resulting from a single-pass approach to fluid ejection.

Figure 1B:
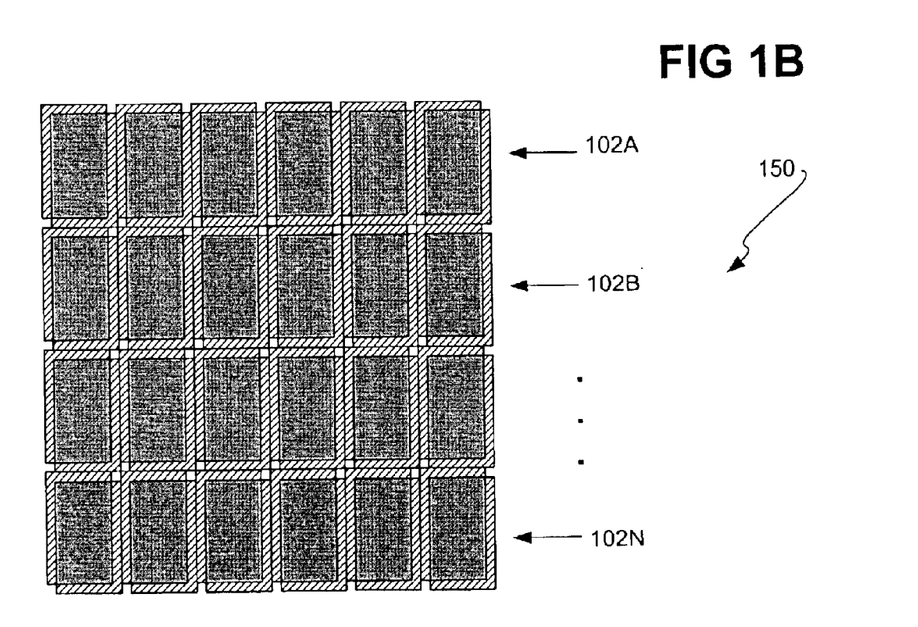
FIG. 1B is a diagram of a simplified example output resulting from a multiple-pass approach to fluid ejection, in conjunction with which embodiments of the invention may be implemented.

FIG. 1B shows a simplified example output 150 of a multiple-pass approach to fluid ejection, in conjunction with which embodiments of the invention may be utilized. Fluid output on the media swaths 102 is again depicted. On each of the swaths 102, fluid is output in each of two passes by a fluid-ejection component. That is, the fluid-ejection component passes over a given swath of the media twice, ejecting fluid onto the swath during each pass. Because fluid is ejected onto the media swaths 102 twice, the visible defects that occurred in the output 100 of FIG. 1A, depicting single-pass fluid ejection, can be obscured. This is because multiple-pass approaches to fluid ejection can specify different amounts of fluid being output at different positions on a swath. The multiple-pass approach that is utilized may be an error-hiding approach, or another type of multiple-pass approach.

Figure 1C:
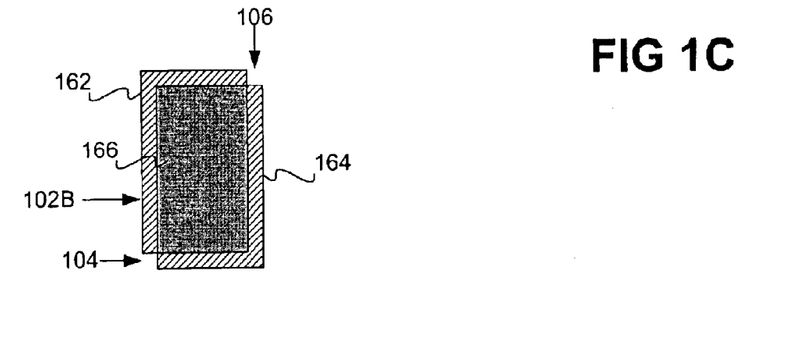
FIG. 1C is a diagram of a portion of the simplified example output of FIG. 1B in more detail, according to an embodiment of the invention.

FIG. 1C shows a portion of the fluid output on the media swath 102B in accordance with the multiple-pass approach of FIG. 1B in more detail, according to an embodiment of the invention. The fluid output 162 results from a first pass over the media swath 102B, whereas the fluid output 164 results from a second pass over the swath 102B. The second-pass fluid output 164 overlaps with the first-pass fluid output 162 in the area 166. Because the second-pass fluid output 164 is shifted to the right and down relative to the first-pass fluid output 162, the horizontal gap 104 and the vertical gap 106 are substantially obscured. Thus, the multiple-pass approach of FIGS. 1B and 1C provides for improved image quality over the single-pass approach of FIG. 1A.

The multiple-pass approach that has been described is a two-pass approach, in which fluid is ejected over each media swath two times. However, more generally a multiple-pass approach is an n-pass approach, in which fluid is ejected over each media swath n times. In some implementations of multiple-passes approaches, the same fluid-ejection component ejects fluid in every pass over a media swath. This results in slower image formation on the media, because the fluid-ejection component has to be moved over each media swath two or more times, corresponding to the number of passes of the multiple-pass approach. Embodiments of the invention decrease or eliminate this performance penalty, as is now particularly described.

Fluid-Ejection Assembly

Figure 2A:
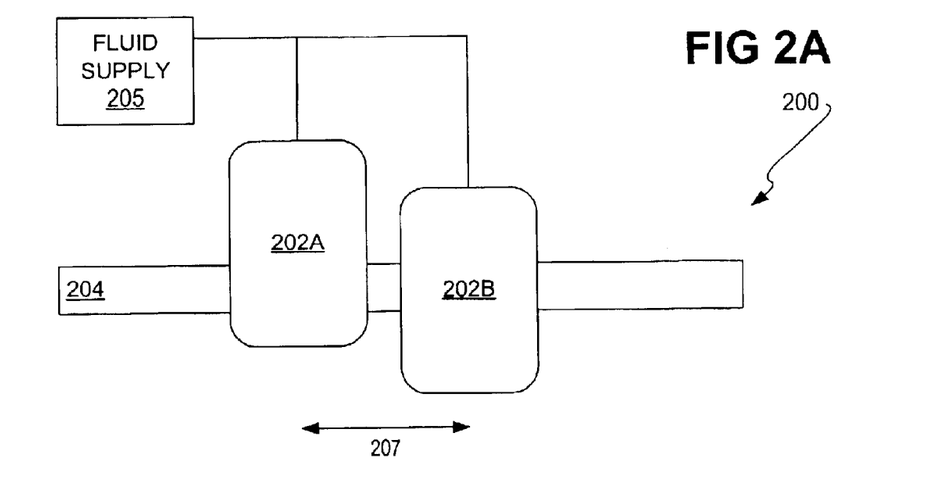
FIGS. 2A, 2B, and 2C are diagrams of a fluid-ejection assembly in which different fluid-ejection devices eject fluid in the same passes over media swaths according to different intended passes of a multiple-pass approach, according to varying embodiments of the invention.

FIG. 2A shows a fluid-ejection assembly 200, according to an embodiment of the invention. The fluid-ejection assembly 200 includes fluid-ejection devices 202A and 202B, collectively referred to as the fluid-ejection devices 202, slidably mounted on a carriage 204 and fluidly coupled to a fluid supply 205. As can be appreciated by those of ordinary skill within the art, the fluid-ejection assembly 200 may include other components besides those depicted in FIG. 2A. The fluid-ejection devices 202 may each be an ink-jet printhead that ejects ink in one embodiment of the invention, such that the fluid supply 205 supplies ink. The fluid-ejection devices 202 may be considered fluid-ejection components in one embodiment of the invention. The devices 202 move in unison back and forth over the carriage 204, as indicated by the bi-directional arrow 207. Thus, when media is advanced under the fluid-ejection devices 202, the devices 202 both can eject fluid on the same swath of media.

Each of the fluid-ejection devices 202 is responsible for ejecting fluid from the fluid supply 205 onto a given media swath in accordance with a different intended pass of a multiple-pass approach to ejecting fluid on the swath. For instance, the device 202A may be responsible for the fluid output 162 on the swath 102B of FIG. 1C and the device 202B may be responsible for the fluid output 164 on the swath 102B. However, because the fluid-ejection devices 202 can eject fluid on the same swath of media, the different intended passes can be accomplished in a single actual physical pass over the media swath. That is, rather than having a single fluid-ejection component eject fluid in accordance with two different intended passes in two actual physical passes over a media swath, the device 202A ejects fluid in accordance with a first intended pass in one pass over the swath, and the device 202B ejects fluid in accordance with a second intended in the same pass over the swath. The passes of the multiple-pass approach are referred to as intended passes when different fluid-ejection components eject fluid in accordance with these passes, because the fluid-ejection components eject the fluid in accordance with the passes in the same physical pass over a media swath. That is, both the fluid-ejection device 202A and the fluid-ejection device 202B move over a media swath in the same pass. However, the fluid-ejection device 202A ejects fluid in one pass in accordance with a first pass of the multiple-pass approach for the media swath, whereas the fluid-ejection device 202B ejects fluid in the same pass in accordance with a second pass of the multiple-pass approach. The first and the second passes of the multiple-pass approach are thus referred to as intended passes of the multiple-pass approach, because the devices 202 actually eject fluid in accordance therewith in the same single physical pass over the media swath.

Furthermore, there may be more intended passes of the multiple-pass approach than the number of fluid-ejection components. For instance, the multiple-pass approach may be a four-pass approach. In a first pass over a media swath, the fluid-ejection device 202A may eject fluid over the swath according to a first intended pass of the multiple-pass approach, whereas the fluid-ejection device 202B may eject fluid over the swath according to a second intended pass of the multiple-pass approach. In a second pass over the media swath, the device 202A may eject fluid over the swath according to a third intended pass, whereas the device 202B may eject fluid over the swath according to a fourth intended pass. Thus, multiple physical passes over the same media swath still occur, but the number of physical passes is less by a factor of the number of fluid-ejection components as compared to if only one fluid-ejection component were responsible for all the intended passes of the multiple-pass approach.

Utilizing different fluid-ejection components for different intended passes of a multiple-pass approach for a media swath to eject fluid over the media swath in the same pass provides for faster image formation on the media. In general, where n different passes are intended for each media swath, having n fluid-ejection components responsible for ejecting fluid onto each media swath in one physical pass, in lieu of having one fluid-ejection component responsible for ejecting fluid on each swath in n physical passes, provides for faster image formation on the media by a factor of n. Furthermore, where n different passes are intended for each media swath, having m fluid-ejection components responsible for ejecting fluid onto each media swath in $$\frac{n}{m}$$

physical passes, in lieu of having one fluid-ejection component responsible for ejecting fluid on each swath in n physical passes, provides for faster image formation on the media by a factor of $$\frac{n}{m}.$$

Figure 2B:
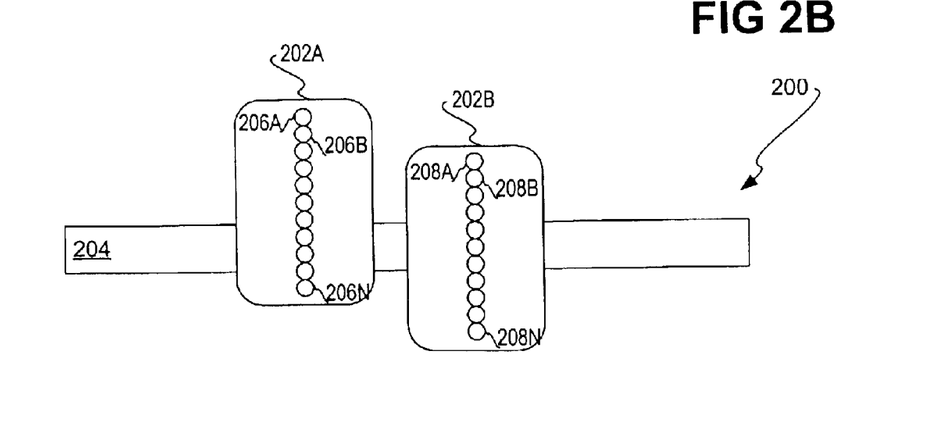

FIG. 2B shows the fluid-ejection assembly 200 in more detail, according to an embodiment of the invention. The fluid-ejection device 202A is staggered relative to the fluid-ejection device 202B on the carriage 204. The fluid-ejection device 202A includes a series of fluid-ejection nozzles 206A, 206B, . . . 206N, collectively referred to as the fluid-ejection nozzles 206, whereas the fluid-ejection device 202B includes a series of fluid-ejection nozzles 208A, 208B, . . . 208N, collectively referred to as the fluid-ejection nozzles 208. The nozzles 206 and 208 are likewise staggered relative to one another. The nozzles 206 and 208 each eject fluid, such as ink. In one embodiment, the nozzles 206 and 208 may be inkjet nozzles. Furthermore, in one embodiment, the nozzles 206 and 208 may be considered the fluid-ejection components that eject fluid in accordance with different intended passes of a multiple-pass approach in the same pass over a swath of media.

Figure 2C:
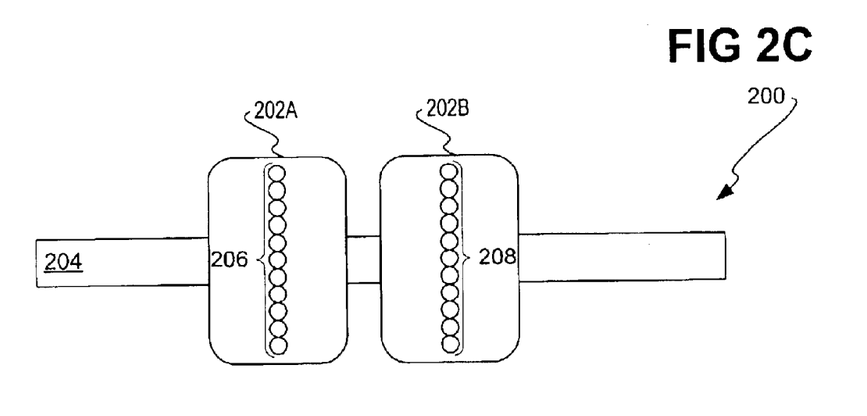

FIG. 2C shows the fluid-ejection assembly 200 in more detail, according to another embodiment of the invention. Unlike the fluid-ejection devices 202 in the embodiment of FIG. 2B, the fluid-ejection device 202A in the embodiment of FIG. 2C is parallel and in-line with the fluid-ejection device 202B on the carriage 204. The nozzles 206 and 208 are likewise parallel and in-line with one another. The assembly 200 of the embodiment of FIG. 2C may be employed for different types of multiple-pass approaches to fluid ejection over media swaths as compared to the assembly 200 of the embodiment of FIG. 2B, as can be appreciated by those of ordinary skill within the art.

The fluid-ejection assembly 200 of the embodiments of FIGS. 2A, 2B, and 2C has been depicted as including different fluid-ejection devices 202 that may function as the different fluid-ejection components responsible for ejecting fluid onto media swaths in the same physical pass but in accordance with different intended passes of a multiple-pass approach. That is, each of the fluid-ejection devices 202 includes a series of nozzles that eject fluid in accordance with a particular intended pass of a multiple-pass approach. However, in another embodiment of the invention, the same fluid-ejection device may include different series of nozzles that eject fluid in the same single pass but in accordance with different intended passes of a multiple-pass approach, such that the different series of nozzles are the different fluid-ejection components.

Figure 3A:
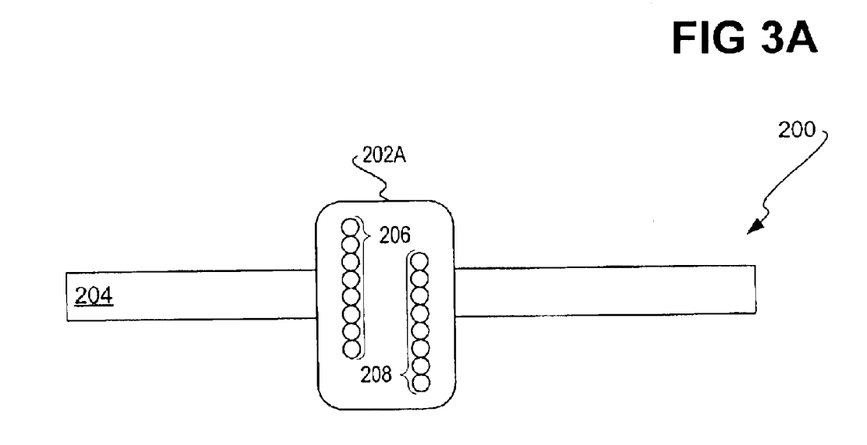
FIGS. 3A and 3B are diagrams of a fluid-ejection assembly in which different series of nozzles eject fluid in the same passes over media swaths according to different intended passes of a multiple-pass approach, according to varying embodiments of the invention.
Figure 3B:
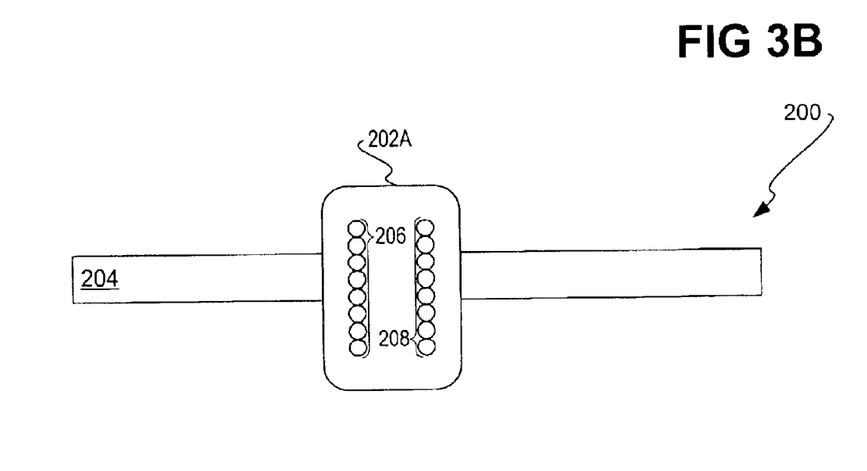

FIGS. 3A and 3B show the fluid-ejection assembly 200 in detail, according to varying such embodiments. The fluid-ejection device 202A is slidably mounted on the carriage 204. The device 202A includes both the series of nozzles 206, as well as the series of nozzles 208. The series of nozzles 206 may be responsible for ejecting fluid in a physical pass over a media swath in accordance with a first intended pass of a multiple-pass approach for the swath, whereas the series of nozzles 208 may be responsible for ejecting fluid in the same physical pass over the media swath in accordance with a second intended pass. Thus, each series of nozzles 206 and 208 may be considered a fluid-ejection component, even though they are both part of the same fluid-ejection device 202A. The difference between the embodiment of FIG. 3A and that of FIG. 3B is the nozzles 206 and 208 are staggered relative to one another in FIG. 3A, whereas they are parallel and in-line with one another in FIG. 3B.

Image-Forming Device

Figure 4:
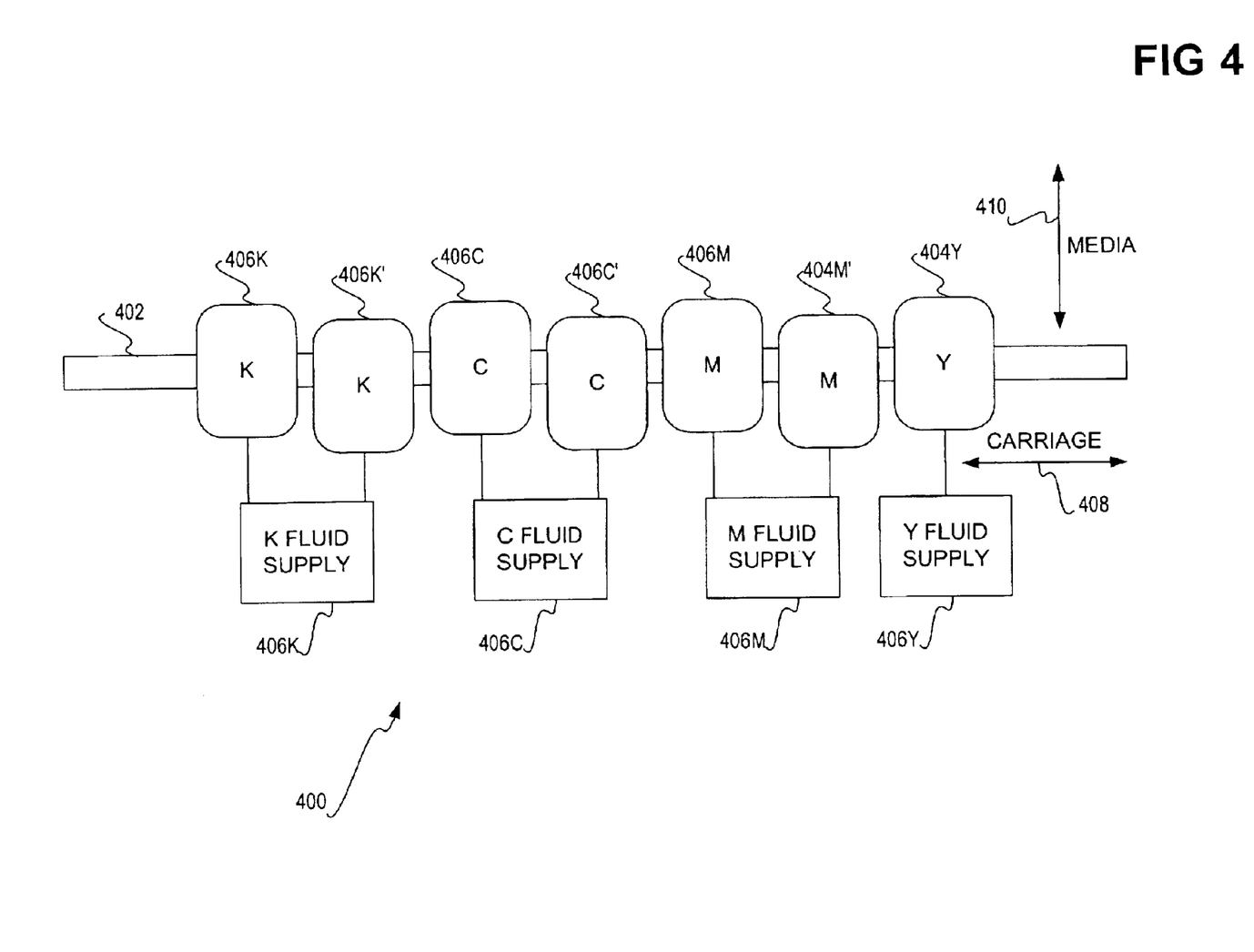
FIG. 4 is a diagram of an image-forming device, according to an embodiment of the invention.

FIG. 4 shows an image-forming device 400, according to an embodiment of the invention. The image-forming device 400 may be an inkjet printer in one embodiment. The image-forming device 400 includes a carriage 402, on which fluid-ejection devices 404K, 404C, 404M, and 404Y, collectively referred to as the fluid-ejection devices 404, and fluid-ejection devices 404K', 404C', and 404M', collectively referred to as the fluid-ejection devices 404', are slidably mounted. The devices 404 and 404' may be inkjet printheads in one embodiment. The image-forming device 400 also includes fluid supplies 406K, 406C, 406M, and 406Y, collectively referred to as the fluid supplies 406. The fluid supplies 406 may be supplies of ink in one embodiment.

The image-forming device 400 may also include other components besides those depicted in FIG. 4. The image-forming device 400 forms an image on media, such as paper, by the fluid-ejection devices 404 and 404' ejecting ink on a swath of the media while moving back and/or forth on the carriage 402, as indicated by the bi-directional arrow 408. This process is repeated for each consecutive media swath, by advancing the media in one of the two directions indicated by the bi-directional arrow 410. Alternatively, the fluid-ejection devices 404 and 404' may remain stationary while only the media moves, or the media may remain stationary while only the fluid-ejection devices 404 and 404' move.

The fluid-ejection devices 404K and 404K' output black fluid, and are fluidly coupled to the fluid supply 406K that supplies black fluid. The fluid-ejection devices 404C and 404C' output cyan fluid, and are fluidly coupled to the fluid supply 406C that supplies cyan fluid. The fluid-ejection devices 404M and 404M' output magenta fluid, and are fluidly coupled to the fluid supply 406M that supplies magenta fluid. Finally, the fluid-ejection device 404Y outputs yellow fluid, and is fluidly coupled to the fluid supply 406Y that outputs yellow fluid. The fluid-ejection devices 404 thus output the colors black, cyan, magenta, and yellow, to form color images on media in the cyan-magenta-yellow-black (CMYK) color space. The image-forming device 400 may, however, have fluid-ejection devices 404 and 404' that output colors in correspondence with other color spaces, or that may output only black or another single color. There may thus be more or less of the fluid-ejection devices 404 and/or 404' in number.

Furthermore, the pair of fluid-ejection devices 404K and 404K', the pair of devices 404C and 404C', and the pair of devices 404M and 404M' may each be implemented in one embodiment as the pair of fluid-ejection devices 202A and 202B of FIGS. 2A–2C. The fluid-ejection device 404Y may be implemented as either the device 202A or the device 202B. In another embodiment, the pair of fluid-ejection devices 404K and 404K', the pair of devices 404C and 404C', and the pair 404M and 404M may each correspond to the pair of series of nozzles 206 and 208 of the fluid-ejection device 202A of FIGS. 3A and 3B. Thus, the fluid-ejection devices 404 and the fluid-ejection devices 404' may be staggered relative to one another, or may be parallel to and in-line with one another.

The fluid-ejection devices 404 eject correspondingly colored fluid onto swaths of the media in single passes according to first intended passes of a multiple-pass approach, whereas the fluid-ejection devices 404' eject correspondingly colored fluid onto the media swaths in the same single passes according to second intended passes of the multiple-pass approach. For instance, for a given media swath, the devices 404K and 404K' eject black fluid onto the media swath in a single pass in accordance with a first intended pass and a second intended pass of the multiple-pass approach. Similarly, the devices 404C and 404C' eject cyan fluid onto the swath in the single pass according to the first intended pass and the second intended pass of the multiple-pass approach, and the devices 404M and 404M' eject magenta fluid onto the swath in the single pass according to the first and the second intended passes of the multiple-pass approach.

Unlike the devices 404K, 404C, and 404M, the fluid-ejection device 404Y does not have a corresponding one of the devices 404'. The fluid-ejection device 404Y ejects yellow fluid onto a given media swath in the single pass in accordance with the first intended pass of the multiple-pass approach. However, there is no corresponding device of the devices 404' that ejects yellow fluid onto the media swath in the single pass in accordance with the second intended pass of the multiple-pass approach in the embodiment of FIG. 4. This is because any visible defects resulting from single pass-only fluid ejection are difficult to discern to the human eye for the color yellow. However, in another embodiment of the invention, there may be a corresponding one of the devices 404' for the fluid-ejection device 404Y. Similarly, in other embodiments, there may not be a corresponding one of the devices 404' for each of one or more of the fluid-ejection devices 404K, 404C, and 404M.

The fluid-ejection devices 404 may also eject, correspondingly colored fluid onto swaths of the media in further single passes according to additional intended passes of a multiple-pass approach, whereas the fluid-ejection devices 404' eject correspondingly colored fluid onto the media swaths in the same further single passes according to other additional intended passes of the multiple-pass approach. For example, the devices 404 may eject fluid onto swaths of media in further singles passes according to third intended passes of a multiple-pass approach, whereas the devices 404' may eject fluid onto swaths of media in the same further single passes according to fourth intended passes of the multiple-pass approach. As another example, the devices 404 may eject fluid onto the media swaths in further single passes according to fifth intended passes, whereas the devices 404' may eject fluid onto the media swaths in the same further single passes according to sixth intended passes, and so on.

Method

Figure 5:
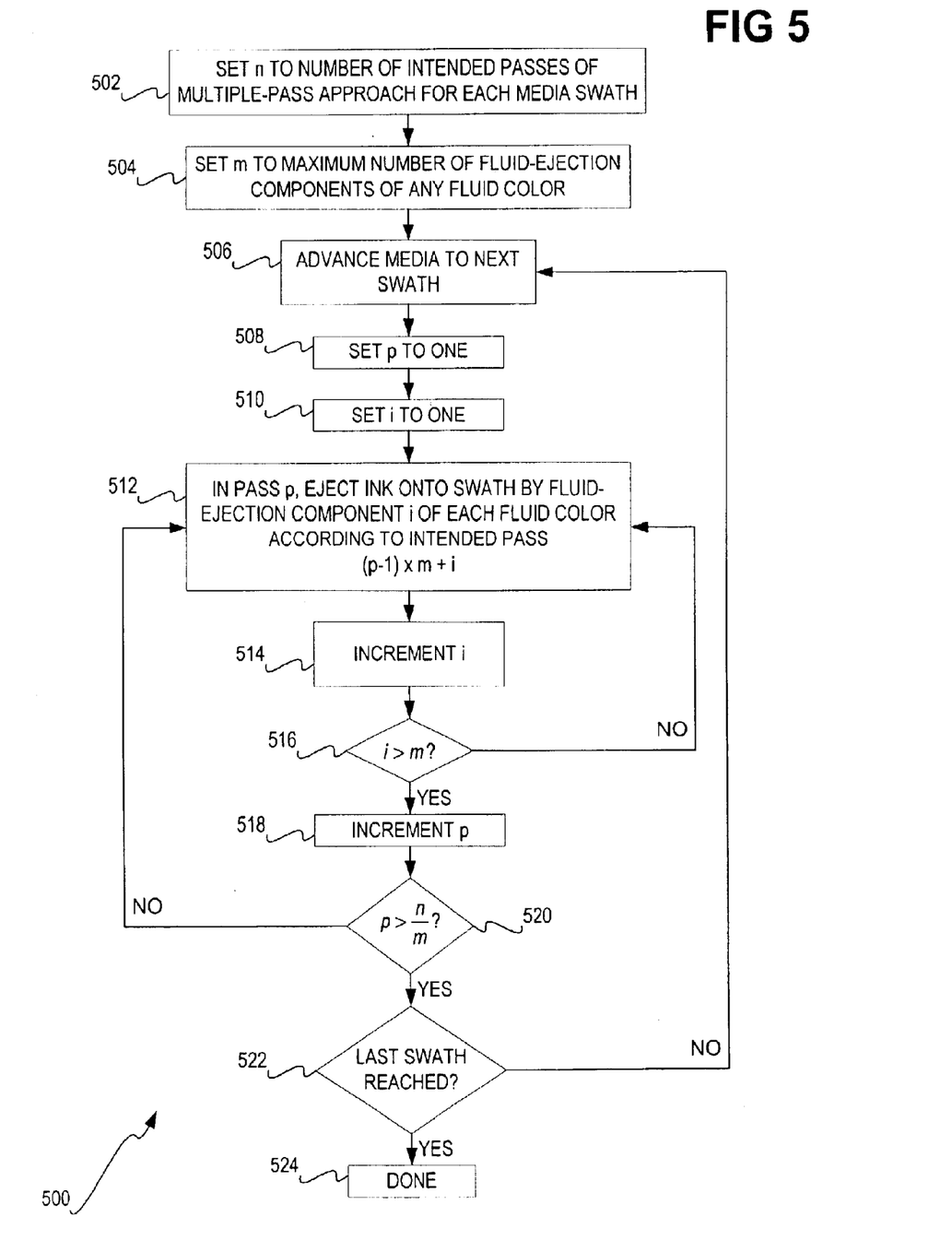
FIG. 5 is a flowchart of a method, according to an embodiment of the invention.

FIG. 5 shows a method 500, according to an embodiment of the invention. A media may have fluid output thereon by performing the method 500, such that an image is formed on the media by the fluid output thereon. A constant n is set to the number of intended passes of the multiple-pass approach for each media swath (502). For example, the simplified example output 150 of FIG. 1B is in accordance with a two-pass approach, such that n is set to two. In general, n is greater than one. Next, a constant m is set to the maximum number of fluid-ejection components of any fluid color (504). For example, in the image-formation device 400 of FIG. 4, each of the colors black, cyan, and magenta has an associated one of the devices 404 and an associated one of the devices 404', such that m is set to two. This is case even though the color yellow has an associated one of the devices 404, but not an associated one of the devices 404'. In general, m is greater than one, and less than or equal to n. Preferably, the ratio $$\frac{n}{m}$$

is an integer.

As another example, the multiple-pass approach may contemplate eight intended passes over each media swath, such that n is set to eight. The image-forming device may have four fluid-ejection components for the color black, two components for the color cyan, two components for the color magenta, and one for the color yellow, such that m is set to four. As an additional example, the multiple-pass approach may contemplate six passes over each media swath, such that n is set to six. The image-forming device may have three fluid-ejection components for the color black, two components for the color cyan, two components for the color magenta, and one for the color yellow, such that m is set to three. The constant m is thus set to the maximum number of fluid-ejection components of any of the fluid colors utilized.

The media is advanced to the next swath (506), and a variable p, corresponding to the physical pass number, is set to one (508). The variable i, corresponding to the fluid-ejection component number of the fluid-ejection components for each color, is also set to one (510). For example, where there are four fluid-ejection components for the color black, two for the color cyan, two for the color magenta, and one for the color yellow, the fluid-ejection component i for each color, where i=1, specifies the first black fluid-ejection component, the first cyan component, the first magenta component, and the first and only yellow component. Where i=2, the fluid-ejection component i for each color specifies the second black component, the second and last cyan component, the second and last magenta component, and none of the yellow components. Where i=3, the fluid-ejection component i for each color specifies the third black component, and none of the components of the other colors. Similarly, where i=4, the fluid-ejection component i for each color specifies the fourth and last black component, and none of the components of the other colors.

In pass p, ink is ejected onto the media swath that has been advanced to by the fluid-ejection component i of each fluid color, where such a fluid-ejection component i of a given fluid color exists, according to the intended pass (p−1)×m+i (512). It is noted that where the physical pass specified by p is the first physical pass, or p=1, the intended pass is always equal to i. Where a fluid-ejection component i of a given fluid color does not exist, then no fluid of this color is ejected. For instance, in the example of the previous paragraph, where i=3, the black fluid-ejection component i ejects fluid, but because there are no third fluid-ejection components for the other colors, fluid of no other color is ejected.

The variable i is incremented by one (514), and if not exceeding the constant m (516), the method 500 repeats 512 et seq. Otherwise, the variable p is incremented by one (518), and if not exceeding the ratio $$\frac{n}{m}(520),$$

the method 500 repeats 510 et seq. Otherwise, if the last swath of the media has not been reached (522), then the method 500 repeats 506 et seq. Once the last swath of the media has been reached (522), the method 500 is finished (524).

CONCLUSION

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

What is claimed is:

1. A method comprising:
   ejecting fluid of a first color over a current swath of media in one pass by a first fluid-ejection component according to a first intended pass of a multiple-pass approach for the current swath;
   ejecting fluid of the first color over the current swath of media in the one pass by a second fluid-ejection component according to FL second intended pass of the multiple-pass approach for the current swath;
   ejecting fluid of a second color over the current swath of media in the one pass by a third fluid-ejection component according to the first intended pass of the multiple-pass approach for the current swath; and, ejecting fluid of the second color over the current swath of media in the one pass by a fourth fluid-ejection component according to the second intended pass of the multiple-pass approach for the current swath.

2. The method of claim 1, further comprising ejecting fluid over the current swath of media in the one pass by a fifth fluid-ejection component according to a third intended pass of the multiple-pass approach.

3. The method of claim 1, further comprising:

advancing the media so that a next swath of media becomes the current swath; and, repeating ejecting fluid over the current swath of media in a one pass by the first fluid-ejection component according to a first intended pass of the multiple-pass approach and by the second fluid-ejection component according to a second intended pass of the multiple-pass approach for the current swath.

4. The method of claim 1, further comprising ejecting fluid over the current swath of media in a second pass by the first fluid-ejection component according to a third intended pass of the multiple-pass approach for the current swath.

5. The method of claim 4, further comprising ejecting fluid over the current swath of media in the second pass by the second fluid-ejection component according to a fourth intended pass of the multiple-pass approach for the current swath.

6. The method of claim 1, further comprising:

ejecting fluid of a third color over the current swath of media in the one pass by a fifth fluid-ejection component according to the first intended pass of the multiple-pass approach for the current swath; and, ejecting fluid of the third color over the current swath of media in the one pass by a sixth fluid-ejection component according to the second intended pass of the multiple-pass approach for the current swath.

7. The method of claim 6, further comprising ejecting fluid of a fourth color over the current swath of media in the one pass by a seventh fluid-ejection component according to the first intended pass of the multiple-pass approach for the current swath.

8. The method of claim 7, further comprising ejecting fluid of the fourth color over the current swath of media in the one pass by an eighth fluid-ejection component according to the second intended pass of the multiple-pass approach for the current swath.

9. A fluid-ejection assembly comprising:

a first fluid-ejection component to eject fluid of a first color over media swaths in first passes according to first intended passes of a multiple-pass approach;

a second fluid-ejection component to eject fluid of the first color over the media swaths in the first passes according to second intended passes of the multiple-pass approach;

a third fluid-ejection component to eject fluid of a second color over the media swaths in the first passes according to the first intended passes of the multiple-pass approach; and, a fourth fluid-ejection component to eject fluid of the second color over the media swaths in the first passes according to the second intended passes of the multiple-pass approach; and, a fifth fluid-ejection component to eject fluid of a third color over the media swaths in the first passes according to the first intended passes of the multiple-pass approach.

10. The fluid-ejection assembly of claim 9, further comprising one or more additional fluid-ejection components to eject fluid over the media swaths in the first passes according to one or more additional passes of the multiple-pass approach.

11. The fluid-ejection assembly of claim 9, further comprising a sixth fluid-ejection component to eject fluid of the third color over the media swaths in the first passes according to the second intended passes of the multiple-pass approach.

12. The fluid-ejection assembly of claim 11, further comprising a seventh fluid-ejection component to eject fluid of a fourth color over the media swaths in the first passes according to the first intended passes of the multiple-pass approach.

13. The fluid-ejection assembly of claim 11, further comprising an eighth fluid-ejection component to eject fluid of the fourth color over the media swaths in the first passes according to the first intended passes of the multiple-pass approach.

14. The fluid-ejection assembly of claim 11, wherein the first color, the second color, the third color, and the fourth color is each uniquely selected from: cyan, magenta, yellow, and black.

15. The fluid-ejection assembly of claim 9, further comprising a carriage on which the first and the second fluid-ejection components are situated.

16. The fluid-ejection assembly of claim 9, wherein the first fluid-ejection component comprises a first series of fluid-ejection nozzles and the second fluid-ejection component comprises a second series of fluid-ejection nozzles.

17. The fluid-ejection assembly of claim 16, wherein the first series of fluid-ejection nozzles is one of parallel to and staggered relative to the second series of fluid-ejection nozzles.

18. The fluid-ejection assembly of claim 16, wherein each of the first and the second series of fluid-ejection nozzles comprises an inkjet nozzle ejecting ink.

19. The fluid-ejection assembly of claim 9, wherein the first fluid-ejection component and the second fluid-ejection component each is an inkjet printhead, and the fluid ejected thereby is ink.

20. The fluid-ejection assembly of claim 9, wherein the first fluid-ejection component and the second fluid-ejection component each is part of a same inkjet printhead, and the fluid ejected thereby is ink.

21. The fluid-ejection assembly of claim 9, wherein the multiple-pass approach is an error-hiding approach.

22. A fluid-ejection assembly comprising:

fluid sources; and, means for ejecting fluid of different colors supplied by the fluid sources to effect multiple intended passes over a swath of media in one pass over the swath of media, such that at each position of a plurality of positions alone the swath of media the fluid of a first color is ejected onto the position according to each of the multiple intended passes before the fluid of a second color is ejected onto the position according to each of the multiple intended passes.

23. The fluid-ejection assembly of claim 22, wherein the means for ejecting comprises a plurality of fluid-ejection components, each of which is responsible for ejecting fluid over the swath of media according to a different one of the multiple intended passes in the one pass over the swath of media.

24. The fluid-ejection assembly of claim 22, wherein the fluid supplied by the fluid source is ink.

25. An image-forming device comprising
a plurality of fluid-ejection components, each fluid-ejection component ejecting fluid of a first color over swaths of media in single passes according to different intended passes of a multiple-pass approach; and,
one or more second fluid-ejection components, each second fluid-ejection component ejecting fluid of a second color over the swaths of media in the single passes according to the different intended passes of the multiple-pass approach,
wherein, at each position of a plurality of position along each swath of media the fluid of the first color is ejected onto the position according to each of the different intended passes before the fluid of the second color is ejected onto the position according to each of the different intended passes.

26. The image-forming device of claim 25, further comprising:
one or more third fluid-ejection components, each third fluid-ejection component ejecting fluid of a third color over the swaths of media in the single passes according to the different intended passes of the multiple-pass approach; and,
one or more fourth fluid-ejection components, each fourth fluid-ejection component ejecting fluid of a fourth color over the swaths of media in the single passes according to the different intended passes of the multiple-pass approach.

27. The image-forming device of claim 25, wherein each fluid-ejection component comprises a series of fluid-ejection nozzles.

28. The image-forming device of claim 27, wherein the series of fluid-ejection nozzles of each fluid-ejection component is one of parallel to and staggered relative to the series of nozzles of each of one or more adjacent fluid-ejection components.

29. The image-forming device of claim 25, wherein each of the plurality of fluid-ejection components is an inkjet printhead, and the fluid ejected thereby is ink.

30. The image-forming device of claim 25, wherein each of the plurality of fluid-ejection components is part of a same inkjet printhead, and the fluid ejected thereby is ink.

31. A media having fluid output thereon in accordance with a method comprising:
ejecting fluid over swaths of the media in single passes by one or more first fluid-ejection components according to first intended passes of a multiple-pass approach, each first fluid-ejection component outputting fluid of a different color; and,
ejecting fluid over the swaths of the media in the single passes by one or more second fluid-ejection components according to second intended passes of the multiple-pass approach, each second fluid-ejection component outputting fluid of a different color,
wherein, at each position of a plurality of position along each swath of media the fluid of the first color is ejected onto the position according to each of the first intended passes before the fluid of the second color is ejected onto the position according to each of the second intended passes.

* * * * *